Patented July 15, 1952

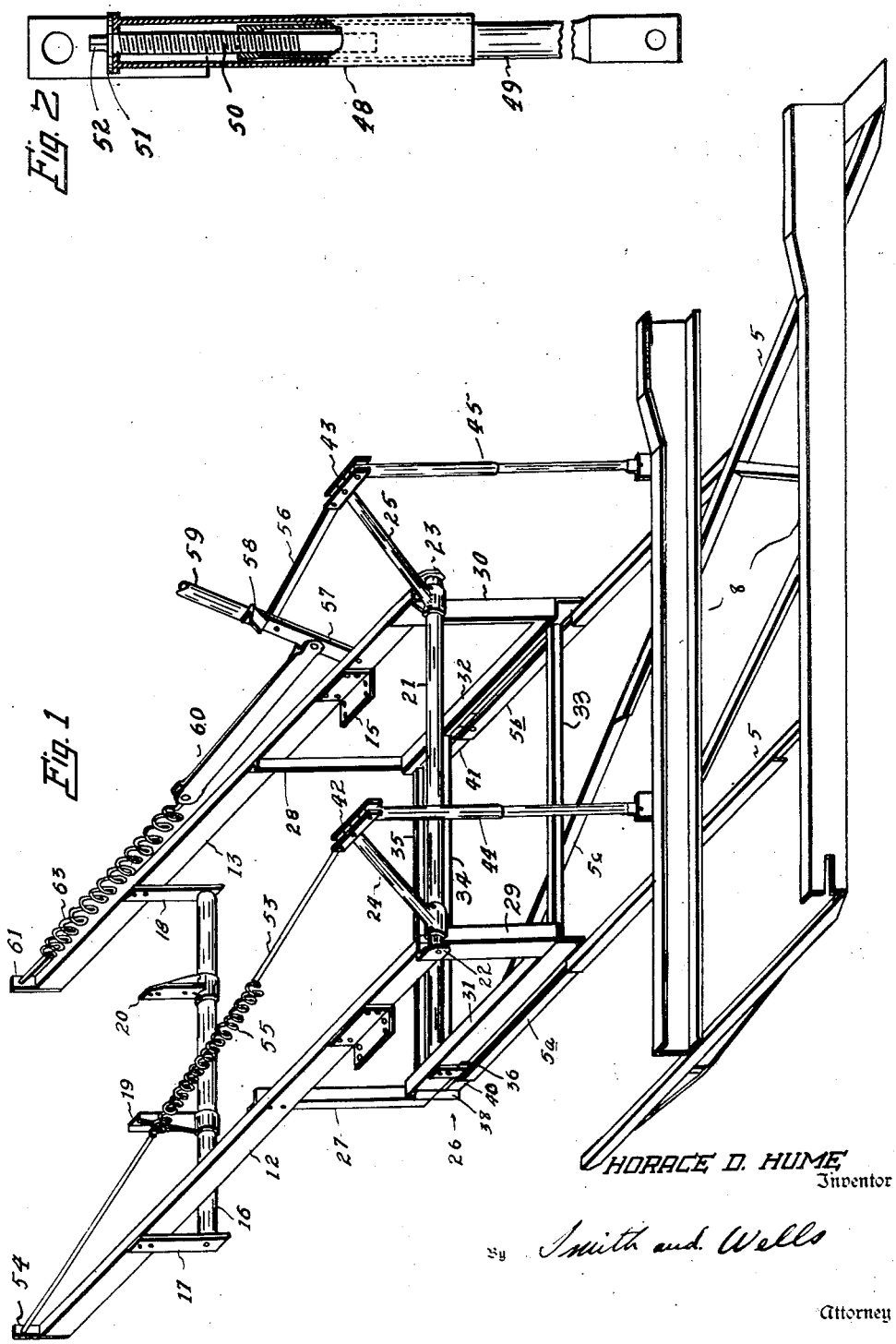

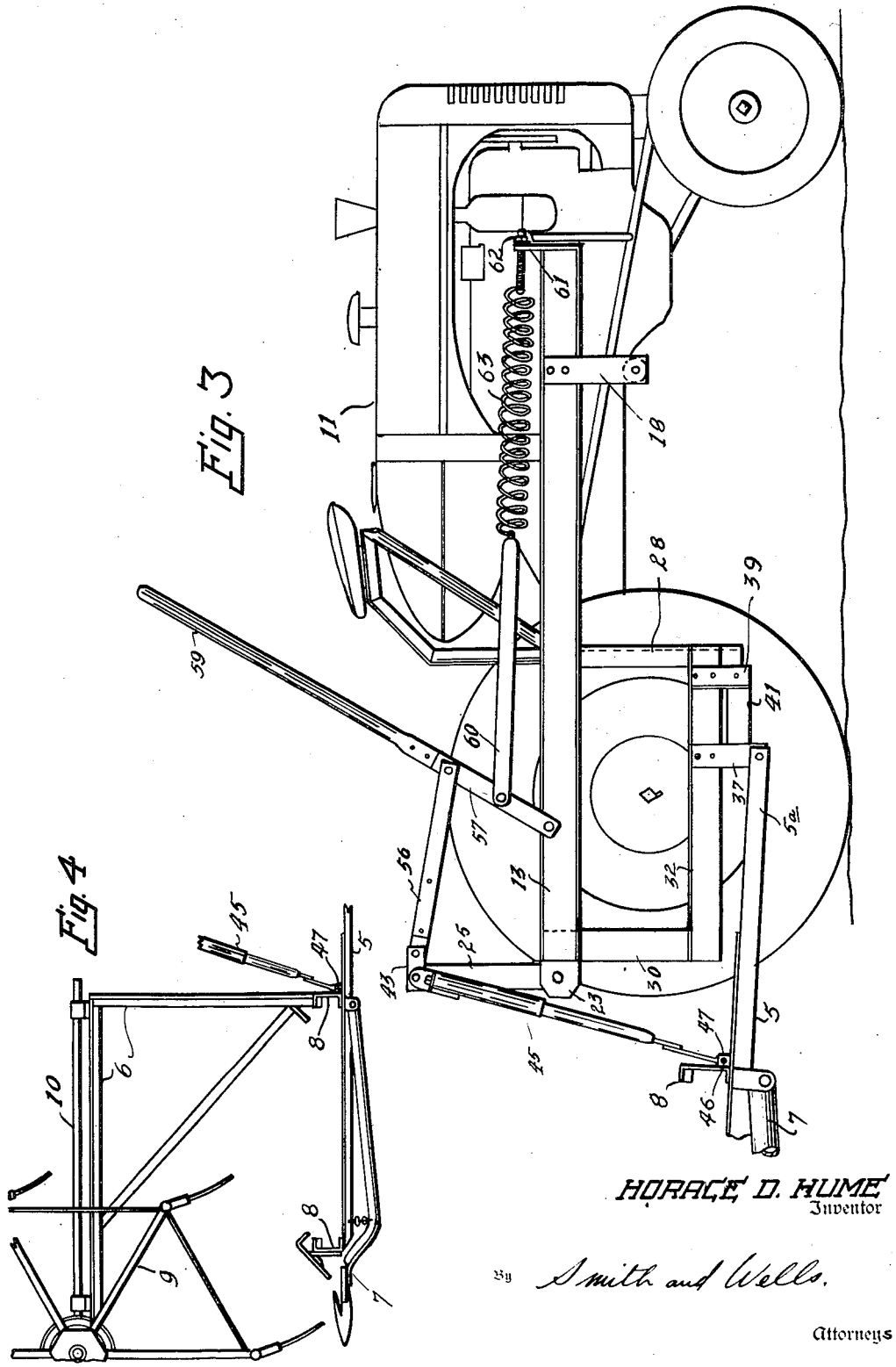

2,603,054

UNITED STATES PATENT OFFICE 2,603,054

HARVESTER SUPPORT MECHANISM

Horace D. Hume, Mendota, Ill.

Application November 23, 1945, Serial No. 630,373

1 Claim. (Cl. 56—208)

The present invention relates to a harvesting support method and more particularly to a new method of balancing a push type harvester from the tractor. As pointed out in my prior application Serial No. 508,112 filed October 29, 1943, which was abandoned and replaced by substituted application, Serial No. 666,617, filed May 2, 1946, on which Patent No. 2,413,873 was issued January 7, 1947, the push type of harvester is of particular advantage in that it avoids losses due to the wheels of the machine crushing down a portion of the crop as the pulled type of harvester did. Also it enables low-lying crops to be cut closely avoiding losses. The push type harvester, however, in order to function at its best, should be supported in such fashion as to respond quickly and easily to action by the operator to raise and lower it to meet uneven ground contours and crop heights. It must be capable of fairly high speed of travel while cutting, and it should be capable of travelling from field to field with safety without the necessity of dismantling or of fastening parts more securely.

It is the principal purpose of my invention to provide an improved method and means of supporting the harvester from the tractor or other pushing device whereby to accomplish the results mentioned above.

Another and more specific object of the invention is to provide an improved support means for push type harvesters whereby they are substantially "floated" while operating at high and low cutting levels so as to be easily and quickly shifted by a light force exerted by the operator and yet securely carried when raised to non-cutting position to prevent bouncing up and down on rough terrain.

My invention in accomplishing the aforesaid objects contemplates the support of the cutting and draper mechanism and the reels on a frame which is projected in front of the pusher device or tractor and which is swingable up and down. The frame is controlled in its swinging movement by a system of levers and resilient means so that movement by applied force is quite easy but bouncing or vertical swinging of the frame is opposed in such a way as quickly to clamp out any frame movement initiated by the harvesting mechanism.

The novel features that I consider characteristic of my invention are set forth with particularity in the appended claim. The invention itself, however, both as to its embodiment and its method of operation, together with additional objects and advantages thereof, will best be understood from the following description and the accompanying drawings illustrating a preferred form of the invention.

In the drawings:

Figure 1 is a perspective view of a harvester frame and its supporting mechanism, the reel and draper and cutting mechanisms being left off for the sake of clarity since they are of known construction;

Figure 2 is a longitudinal sectional view through an adjustable supporting arm forming a part of the construction in which my invention is embodied;

Figure 3 is a view in side elevation of the supporting mechanism applied to a tractor; and, Figure 4 is a fragmentary side view of the harvester mechanism which is supported.

A harvester mechanism to which my invention applies usually has a main frame 5 on which (see Figure 4) a reel frame 6, a cutter frame 7, and a draper frame 8 are mounted. A reel 9, reel driving means 10 and draper and cutting mechanisms (not shown) are mounted by the frames 5, 7, and 8 and driven from a tractor 11 by suitable power take-off devices (not shown). According to my invention the harvester mechanism is supported in a "floating" manner by the tractor 11. The particular construction by which this support is accomplished is illustrated in Figures 1, 2, and 3.

Two side beams 12 and 13 are mounted on the tractor by two front brackets 14 and 15 and a rear cross bar 16. The cross bar 16 is fixed to the beams 12 and 13 by two bars 17 and 18 and carries two adjustable brackets 19 and 20, that are fastened to the tractor by bolts or screws. At their front ends the beams 12 and 13 mount a rock shaft 21 which is pivoted by two brackets 22 and 23 at the front ends of the beams. The shaft is the base member of a crank having two parallel arms 24 and 25.

A sub-frame 26 for mounting the rear end of the frame 5 is suspended from the beams 12 and 13 by four angle irons 27, 28, 29, and 30, all bolted to the beams and welded to two side frame members 31 and 32. Cross ties 33, 34, and 35 connect the members 31 and 32. Two bars 36 and 37 are bolted to the members 31 and 32 and extend downwardly. These bars are braced by additional bars 38 and 39, rearwardly spaced from the bars 36 and 37 and bolted to the members 31 and 32 and two horizontally running bars 40 and 41 connecting the bars 36 and 38 and 37 and 39 respectively. The frame 5 has two rearwardly extending arms 5a and 5b and a diagonal arm 5c. The arms 5a and 5c are pivoted to the bar 36. The arm 5b is pivoted to the bar 37.

The arms 24 and 25 of the crank have brackets 42 and 43 welded thereto at their top ends. These brackets pivotally mount two links 44 and 45 the lower ends of which are pivotally secured by pivot pins 46 to brackets 47 that are provided on the frame 5 immediately behind the rear member of the draper frame 8. These links 44 and 45 are adjustable in length as illustrated in Figure 2 of the drawings. Each link has two telescoping tubular sections 48 and 49. The inner section 49 is threaded at the top to receive a screw 50 which has a bearing flange 51 resting on the top of the section 48. The screw has a head 52 thereon to receive a wrench.

The bracket 42 pivotally mounts the front end of a resilient link 53. The rear end of this link extends through an upstanding bracket 54 welded on the rear end of the beam 12. The rear end of the link 53 is threaded and is provided with an adjusting nut. The intermediate portion of the link 53 comprises a spring 55.

The bracket 43 is connected by a link 56, to an operating lever 57 which is pivoted to the beam 13. This lever carries a foot piece 58 and extends upward to provide a handle 59. A resilient link 60 is connected between the lever 57 and an upstanding bracket 61 fastened to the rear end of the beam 13. The rear end of the link 60 is threaded and extends through the bracket 61. A nut 62 is provided for the threaded end of the link to adjust the length of the link. The intermediate portion of the link 60 comprises a coiled spring 63.

The arrangement of the crank, the links 44 and 45, and the links 53 and 56 is such that the crank movements are generally between a nearly vertical position (see Figure 3) when the harvester mechanism is raised for transport, a position approaching 45 degrees to the vertical (see Figure 1) when the harvester mechanism is lowered to the lowest cutting position. In this way advantage is taken of the crank action to give greater leverage on the harvester frame as the tension on the spring is reduced by upward and rearward movement of the crank. By this arrangement I am able to obtain a substantial balance of the spring force with the harvester weight from the position where the cutter bar contacts the ground through all cutting levels. In combination with the floating cutter frame 7 (shown in Figure 4) a very sensitive control is obtained. It is believed to be evident that if the spring tension is such that the total weight of the reel, draper, and cutter frames with their associated mechanisms, are somewhat heavier than the springs can support the cutter bar shoes will rest lightly on the ground and be able to follow the contour of the ground with ease. Moreover when the weight of the cutter frame is taken in part on the ground the springs are relieved so as to be able to lift more on the reel and draper and thus help them to follow the rise and fall of the cutter frame quite closely. In addition the substantially vertical position of the crank when the harvester frame is raised to its upper limit for transport insures firm support of the harvester mechanism for transport. The balance is such that the harvester frame can be lifted and lowered by the operator (using the lever 57) with very little effort. A light force, either by the hand or the foot of the operator is all that is necessary to move the harvester mechanism up or down while running.

It will be observed that the spring 63 is much heavier than the spring 55. This is necessary because of the different lever advantages enjoyed by the two springs. However, certain other advantages also result from such an arrangement. The tendency for sustained oscillations of the springs is cut down because of the different characteristics of the two springs. The spring 55 is, preferably, loaded more nearly to its capacity than the heavier spring as this seems to give a quicker response to manual adjustments by the lever 57 as well as a more sensitive balance.

The mechanism shown and described may, by suitable adjustable brackets and attachments, be fitted to various makes and models of tractors. However, such devices do not affect the present invention which is concerned with the parts carried by the beams 12 and 13 regardless of how the beams may be supported. It is believed that the foregoing description is sufficient to enable those skilled in this art to practice the invention and to readily understand the advantages thereof.

Having thus described my invention, I claim:

Support mechanism for positioning harvesting machinery in advance of a tractor and the like comprising; a crank, a support frame pivotally mounting the crank and having means for attachment to a tractor, resilient link means extending lengthwise of the frame and connecting a point on the frame, at a distance from the crank, to the crank so as to hold the crank in an upwardly extending position, a harvester frame having one end pivoted to the support frame to the rear of the crank and extending forwardly from the support frame, harvester mechanism carried on the forwardly extending portion of the harvester frame and link means suspended from the crank and supportingly secured to the harvester frame, said resilient link means comprising two separate spaced apart links each having a coiled spring section intermediate its ends, the coiled spring section in one link being substantially stronger than in the other link, and a hand lever interposed in the resilient link having the stronger coiled spring section, said lever having its lower end pivoted on said support frame and said link in which the lever is interposed having its non-resilient section extending from the crank to the lever and the coiled spring section extending from the frame to a point on the lever between the pivot thereof and the point of attachment of the non-resilient section to the lever.

HORACE D. HUME.

REFERENCES CITED

The following references are of record in the file of this patent:

UNITED STATES PATENTS

| Number | Name | Date |
|---|---|---|
| 796,268 | Troeger | Aug. 1, 1905 |
| 1,312,388 | Converse | Aug. 5, 1919 |
| 2,215,178 | Hume et al. | Sept. 17, 1940 |
| 2,420,219 | Baldwin | May 6, 1947 |